US011054696B2

(12) United States Patent
Liu et al.

(10) Patent No.: US 11,054,696 B2
(45) Date of Patent: Jul. 6, 2021

(54) ELECTRONIC DEVICES HAVING DISPLAYS WITH DIRECT-LIT BACKLIGHT UNITS

(71) Applicant: Apple Inc., Cupertino, CA (US)

(72) Inventors: Rong Liu, Sunnyvale, CA (US); Jun Qi, San Jose, CA (US); Victor H. Yin, Cupertino, CA (US); Zhenyue Luo, Santa Clara, CA (US)

(73) Assignee: Apple Inc., Cupertino, CA (US)

(*) Notice: Subject to any disclaimer, the term of this patent is extended or adjusted under 35 U.S.C. 154(b) by 0 days.

(21) Appl. No.: 16/629,537

(22) PCT Filed: Aug. 9, 2018

(86) PCT No.: PCT/US2018/046085
§ 371 (c)(1),
(2) Date: Jan. 8, 2020

(87) PCT Pub. No.: WO2019/067095
PCT Pub. Date: Apr. 4, 2019

(65) Prior Publication Data
US 2020/0142259 A1   May 7, 2020

Related U.S. Application Data

(60) Provisional application No. 62/563,557, filed on Sep. 26, 2017.

(51) Int. Cl.
*F21V 21/00* (2006.01)
*G02F 1/13357* (2006.01)
*G02F 1/1335* (2006.01)

(52) U.S. Cl.
CPC .. *G02F 1/133603* (2013.01); *G02F 1/133514* (2013.01); *G02F 1/133606* (2013.01);
(Continued)

(58) Field of Classification Search
CPC ......... G02F 1/133603; G02F 1/133514; G02F 1/133606; G02F 1/133611;
(Continued)

(56) References Cited

U.S. PATENT DOCUMENTS 6,527,410 B2 * 3/2003 Yamaguchi ....... G02F 1/133526
362/243
7,997,771 B2   8/2011 Epstein et al.
(Continued)

FOREIGN PATENT DOCUMENTS

EP       2759856 A2      7/2014
WO    2013156112 A1    10/2013
WO    2017068740 A1     4/2017

OTHER PUBLICATIONS

Broer, Dirk J. et al., Progress in liquid crystal displays by new developments in functional polymers, e-Polymers 1.1 (2001): 221-237.

*Primary Examiner* — Laura K Tso
(74) *Attorney, Agent, or Firm* — Treyz Law Group, P.C.; G. Victor Treyz; Matthew R. Williams

(57) ABSTRACT

An array of pixels in a display may be illuminated by a backlight having an array of light sources such as light-emitting diodes. The light-emitting diodes may be mounted on a printed circuit. A reflector may be formed on the printed circuit to help reflect light from the light-emitting diodes upwards through the pixels. The reflector may include two white ink layers. Multifunctional layers and other optical films may be incorporated into the backlight. These layers may include diffusers, microlens array layers, thin-film interference filters, phosphor layers, light-collimating layers, and reflective polarizers.

23 Claims, 13 Drawing Sheets

(52) U.S. Cl.
CPC .. *G02F 1/133611* (2013.01); *G02F 1/133621* (2013.01); *G02F 1/133521* (2021.01); *G02F 1/133607* (2021.01); *G02F 1/133614* (2021.01)

(58) Field of Classification Search
CPC ......... G02F 1/133621; G02F 1/133614; G02F 1/133521; G02F 1/133607
USPC ....................................................... 362/97.1
See application file for complete search history.

(56) References Cited

U.S. PATENT DOCUMENTS

| | | | |
|---|---|---|---|
| 8,308,331 B2 | 11/2012 | Loh | |
| 8,947,619 B2 | 2/2015 | Li et al. | |
| 2012/0176423 A1* | 7/2012 | Nagato | G02F 1/133621 345/690 |
| 2015/0378077 A1* | 12/2015 | Haag | G02B 5/3041 362/19 |
| 2016/0070137 A1 | 3/2016 | You et al. | |
| 2016/0076731 A1* | 3/2016 | Monch | G02B 19/0014 362/97.1 |
| 2018/0292712 A1* | 10/2018 | Kishimoto | C09K 11/621 |

* cited by examiner

ELECTRONIC DEVICES HAVING DISPLAYS WITH DIRECT-LIT BACKLIGHT UNITS

This application claims priority to U.S. provisional patent application No. 62/563,557, filed on Sep. 26, 2017, which is hereby incorporated by reference herein in its entirety.

BACKGROUND

This relates generally to displays, and, more particularly, to backlit displays.

Electronic devices often include displays. For example, computers and cellular telephones are sometimes provided with backlit liquid crystal displays. Edge-lit backlight units have light-emitting diodes that emit light into an edge surface of a light guide plate. The light guide plate then distributes the emitted light laterally across the display to serve as backlight illumination. Direct-lit backlight units have arrays of light-emitting diodes that emit light vertically through the display.

Direct-lit backlights may have locally dimmable light-emitting diodes that allow dynamic range to be enhanced. If care is not taken, however, a direct-lit backlight may be bulky or may produce non-uniform backlight illumination.

SUMMARY

An array of pixels in a display may be illuminated by a backlight. The backlight may have an array of light sources such as a two-dimensional array of light-emitting diodes. The light-emitting diodes may be mounted on a printed circuit. A reflector may be formed on the printed circuit to help reflect light from the light-emitting diodes upwards through the pixels. The reflector may one or more layers of material such as one or more white ink layers or a reflective multilayer film.

Optical films may be incorporated into the backlight between the two-dimensional array of light-emitting diodes and the pixels. The optical films may include layers such as diffusers, microlens array layers, thin-film interference filters, phosphor layers, light-collimating layers, and reflective polarizers. In some configurations, multifunctional films may be formed.

DETAILED DESCRIPTION

Figure 1:
FIG. 1 is a front view of an illustrative electronic device having a display in accordance with an embodiment.

Electronic devices may be provided with backlit displays. The backlit displays may include liquid crystal pixel arrays or other display structures that are backlit by light from a direct-lit backlight unit. A front view of an illustrative electronic device of the type that may be provided with a display having a direct-lit backlight unit is shown in FIG. 1. Electronic device 10 of FIG. 1 may be a computing device such as a laptop computer, a computer monitor containing an embedded computer, a tablet computer, a cellular telephone, a media player, or other handheld or portable electronic device, a smaller device such as a wrist-watch device, a pendant device, a headphone or earpiece device, a device embedded in eyeglasses or other equipment worn on a user's head, or other wearable or miniature device, a television, a computer display that does not contain an embedded computer, a gaming device, a navigation device, an embedded system such as a system in which electronic equipment with a display is mounted in a kiosk or automobile, equipment that implements the functionality of two or more of these devices, or other electronic equipment.

As shown in FIG. 1, device 10 may have a display such as display 14. Display 14 may be mounted in housing 12. Housing 12, which may sometimes be referred to as an enclosure or case, may be formed of plastic, glass, ceramics, fiber composites, metal (e.g., stainless steel, aluminum, etc.), other suitable materials, or a combination of any two or more of these materials. Housing 12 may be formed using a unibody configuration in which some or all of housing 12 is machined or molded as a single structure or may be formed using multiple structures (e.g., an internal frame structure, one or more structures that form exterior housing surfaces, etc.).

Housing 12 may have a stand, may have multiple parts (e.g., housing portions that move relative to each other to form a laptop computer or other device with movable parts), may have the shape of a cellular telephone or tablet computer (e.g., in arrangements in which no stand is present), and/or may have other suitable configurations. The arrangement for housing 12 that is shown in FIG. 1 is illustrative.

Display 14 may be a touch screen display that incorporates a layer of conductive capacitive touch sensor electrodes or other touch sensor components (e.g., resistive touch sensor components, acoustic touch sensor components, force-based touch sensor components, light-based touch sensor components, etc.) or may be a display that is not touch-sensitive. Capacitive touch screen electrodes may be formed from an array of indium tin oxide pads or other transparent conductive structures.

Display 14 may include an array of pixels 16 formed from liquid crystal display (LCD) components or may have an array of pixels based on other display technologies. A cross-sectional side view of display 14 is shown in FIG. 2.

Figure 2:
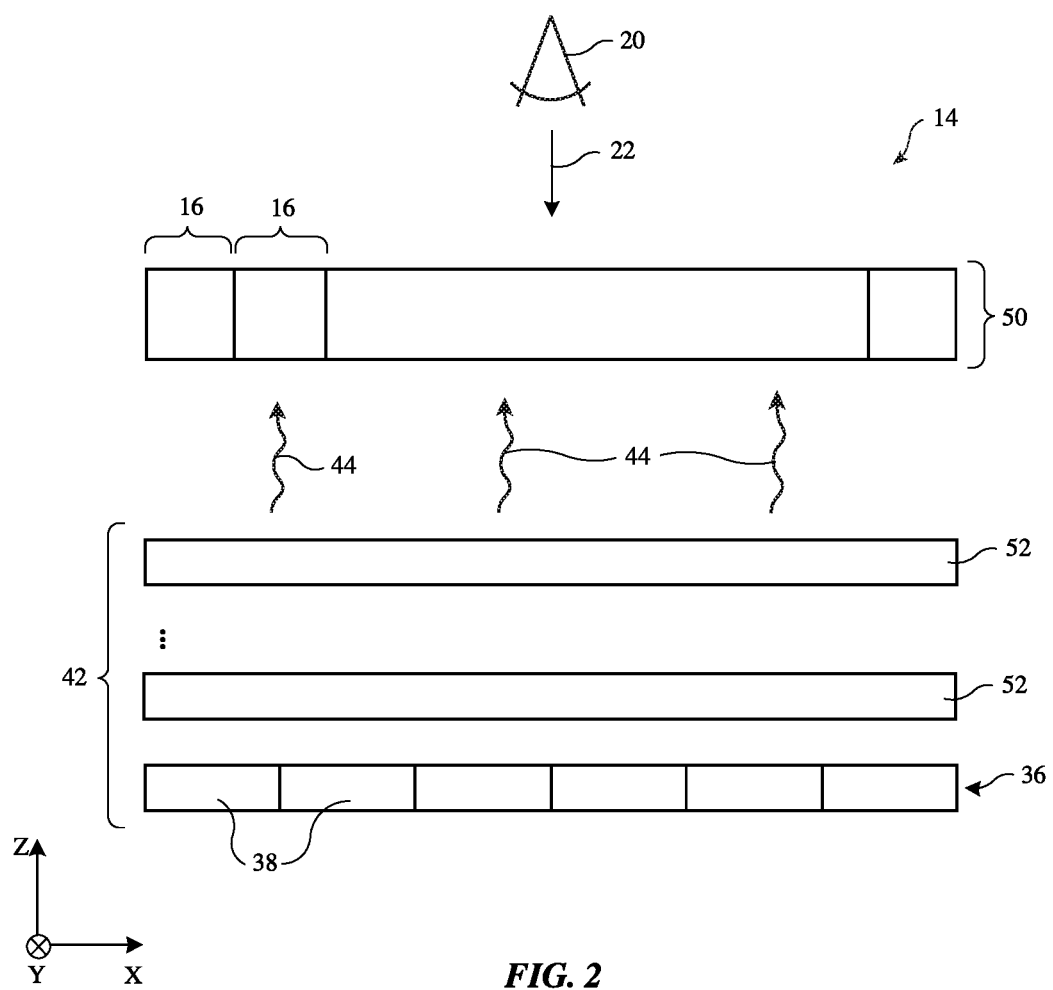
FIG. 2 is a cross-sectional side view of an illustrative display in accordance with an embodiment.

As shown in FIG. 2, display 14 may include a pixel array such as pixel array 50. Pixel array 50 may be a liquid crystal display or other display having an array of pixels 16 configured to display images for a user such as viewer 20 who is viewing display 14 in direction 22. Backlight unit 42 (sometimes referred to as backlight structures or a backlight) may be used to provide backlight illumination 44 for pixels 16.

Backlight unit 42 may include a light source array having cells with light sources such as light-emitting diodes or lasers that produce backlight illumination 44. Backlight unit 42 may, for example, have an array of light-emitting diodes such as light-emitting diode array 36. Light-emitting diode array 36 may contain a two-dimensional array of light-emitting diode cells 38. Light-emitting diode cells 38 may, as an example, be arranged in rows and columns and may lie in the X-Y plane of FIG. 2. Each light-emitting diode cell 38 may include one or more light-emitting diodes that produce light 44. The light produced by light-emitting diode cells 38 may be blue light, ultraviolet light, white light, and/or light of other colors. Configurations in which cells 38 include lasers may also be used, if desired.

During operation, light-emitting diode cells 38 may be controlled in unison by control circuitry in device 10 or may be individually controlled (e.g., to implement a local dimming scheme that helps improve the dynamic range of images displayed on pixel array 50). The light produced by each light-emitting diode cell 38 may travel upwardly along dimension Z through and optical films (layers) 52 before passing through pixel array 50. Layers 52 may include diffuser layers and/or microlens array layers for diffusing and homogenizing light, light-collimating films such as brightness enhancement films (prism films) for collimating light, photoluminescent films such as phosphor layers for producing white illumination 44 from a narrowband light source (e.g., blue or ultraviolet light light-emitting diodes or lasers), thin-film interference filters and/or reflective polarizers (e.g., to help contain and/or recycle light), and/or other optical films.

Figure 3:
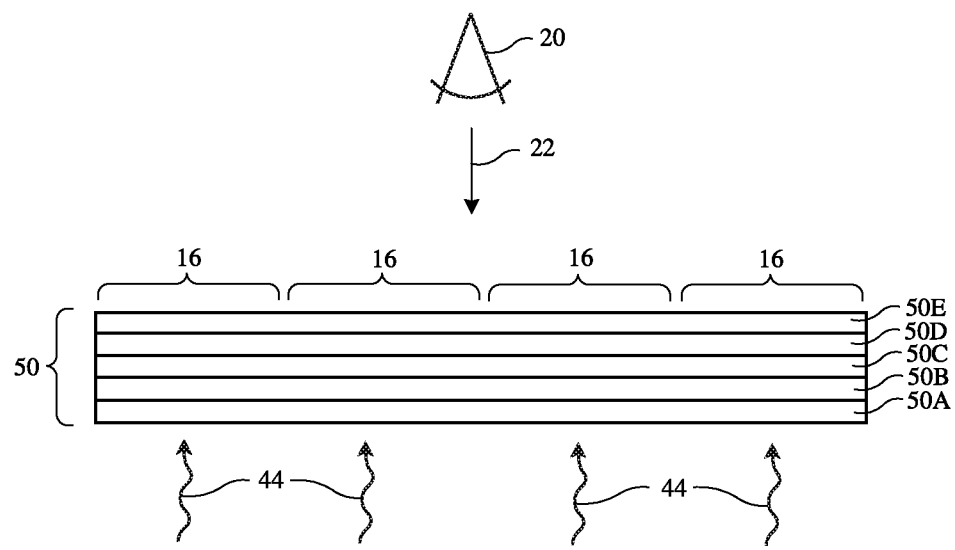
FIG. 3 is a cross-sectional side view of an illustrative array of pixels in accordance with an embodiment.

FIG. 3 shows how pixel array 50 may be formed from liquid crystal display pixels. As shown in FIG. 3, pixel array 50 may form a liquid crystal display having a liquid crystal layer such as liquid crystal layer 50C sandwiched between thin-film transistor layer 50B and color filter layer 50D. Configurations in which the thin-film transistor layer is located on top of layer 50C and the color filter layer is integrated with the thin-film transistor layer or located under layer 50C may also be used. Layers 50D, 50C, and 50B may be interposed between upper polarizer 50E and lower polarizer 50A.

Figure 4:
FIGS. 4 and 5 are cross sectional side view of illustrative displays having reflective polarizer layers in accordance with embodiments.
Figure 5:
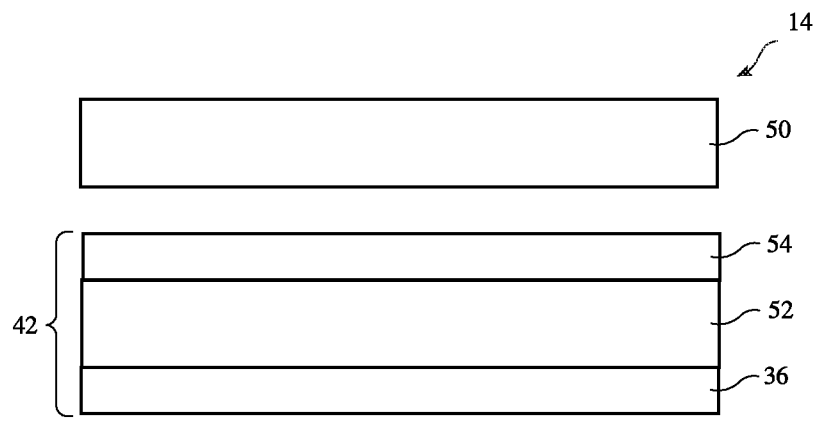

If desired, optical films 52 (FIG. 2) may include a reflective polarizer to help recycle light and thereby enhance backlight efficiency. A reflective polarizer passes light of a given polarization while reflecting light of an orthogonal polarization. In the example of FIG. 4, reflective polarizer 54 has been laminated onto the underside of pixel array 50. This type of configuration may be used, for example, where device 10 is compact and portable. In the example of FIG. 5, reflective polarizer 54 rests on top of other optical films 52 in backlight unit 42. This type of arrangement may be used, for example, where device 10 is a desktop device with a stand or a wall-mounted device.

Figure 6:
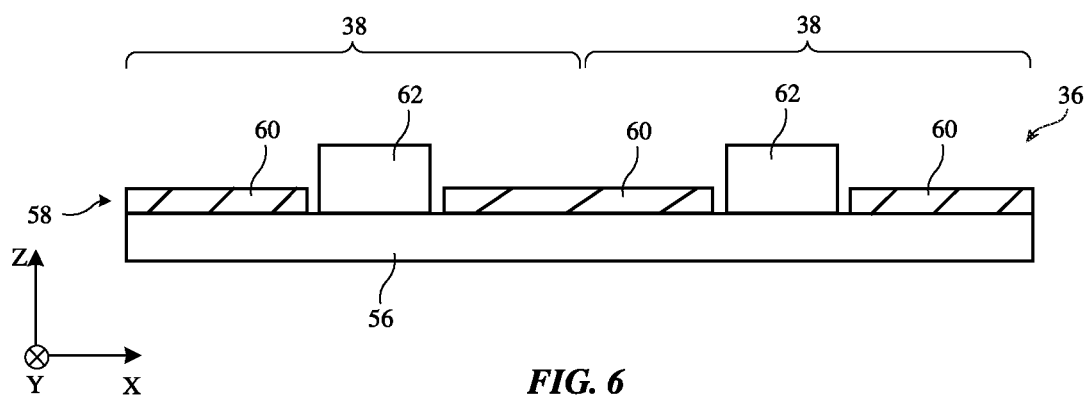
FIGS. 6 and 7 are cross-sectional side views of illustrative two-dimensional light source arrays for a backlight in accordance with embodiments.
Figure 7:
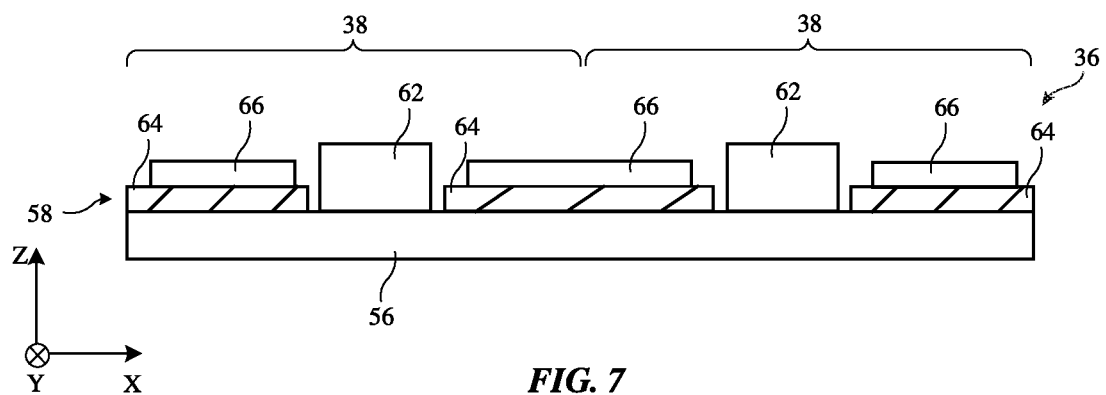

Illustrative configurations for light-emitting diode array 36 are shown in FIGS. 6 and 7. In the example of FIG. 6, an array of light-emitting diodes 62 is mounted (e.g., soldered) to metal traces in printed circuit board 56. Light-emitting diode array 36 may include reflector 58 to help recycle light and enhance backlight efficiency (e.g., by reflecting any light that has been emitted from light-emitting diodes 62 back in the upwards (+Z) direction). Reflector 58 may be formed from reflective layer 60 on printed circuit board 56 (or, if desired, curved cavities formed from a reflective layer). Layer 60 may be formed from a layer of white ink (e.g., a polymer containing titanium oxide particles or other light-scattering particles) or may be formed from a thin-film interference filter film configured to form a highly reflective layer.

Diodes 62 may have lateral dimensions (in the X-Y plane) of about 100-150 microns (as an example). Openings may be formed in layer 60 to allow diodes 62 to be soldered to printed circuit 56.

In the illustrative configuration of FIG. 7, reflector 58 has two layers. Initially a first layer of white ink is deposited such as white ink layer 64. Ink layer 64 may be photopatterned titanium oxide ink that is cured by exposure to ultraviolet light. Ultraviolet-light-cured ink layer 64 may be patterned accurately to minimize gaps between layer 64 and diodes 60. After layer 64 has been deposited and patterned, a second layer of white link such as layer 66 may be deposited. Layer 66 may be deposited and patterned using screen printing and may be cured using thermal curing. Thermally-cured white ink layer 66 may have openings that are aligned with the openings in layer 64. Screen printing tends to be less accurate than photopatterning, so the openings in layer 66 may be made larger than the openings in layer 64 to provide a margin for slight misalignment during the deposition of layer 66. Ink layer 66 may be more reflective than ink layer 64, which enhances the reflectivity of reflector 58.

Figure 8:
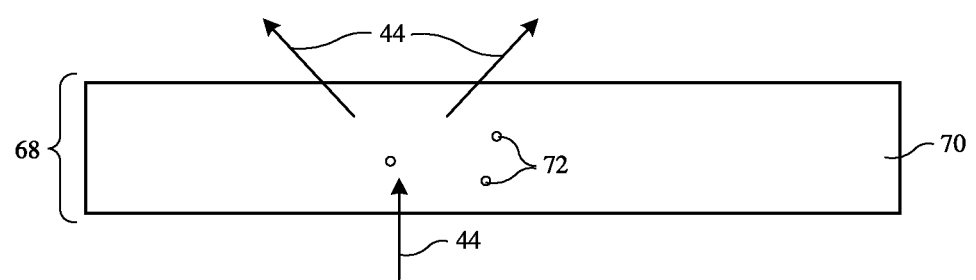
FIG. 8 is a cross-sectional side view of an illustrative diffuser in accordance with an embodiment.

Optical layers 52 may include one or more light-diffuser layers. In the illustrative configuration of FIG. 8, light-diffuser layer 68, which may sometimes be referred to as a diffuser or diffuser layer, has a polymer substrate such as substrate 70 in which light-scattering particles 72 (e.g., titanium oxide particles) have been embedded. Other diffuser configurations may be used, if desired.

Figure 9:
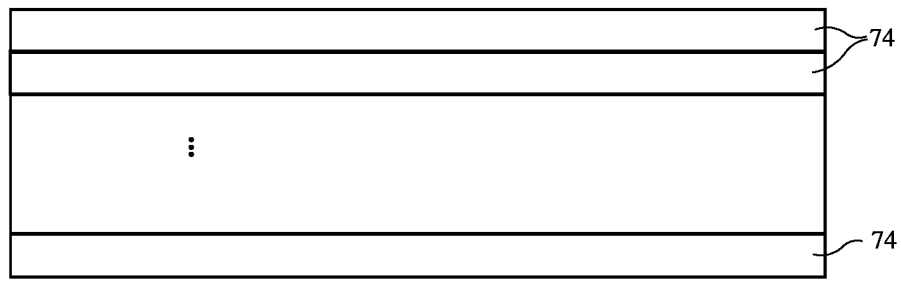
FIG. 9 is a cross-sectional side view of an illustrative dielectric stack for a thin-film interference filter in accordance with an embodiment.

Optical layers 52 may include thin-film interference filter layers. These layers may be formed from a stack of inorganic and/or organic dielectric layers of alternating index of refraction (see, e.g., the dielectric stack of layers 74 of FIG. 9). Thin-film interference filters may form broadband (white light) reflectors (sometimes referred to as mirrors or partial mirrors) and/or may form filters that reflect some colors of light more than others (e.g., to form a filter that has a non-flat visible light reflection spectrum). Thin-film interference filters may be configured to transmit light that is not reflected (e.g., so that light transmission is high at wavelengths that are not reflected). Dielectric stacks such as the stack of layer 74 of FIG. 9 may be formed on polymer or glass substrates and/or may be combined with layers of material that perform other functions (e.g., as thin-film interference filter coating layers).

Figure 10:
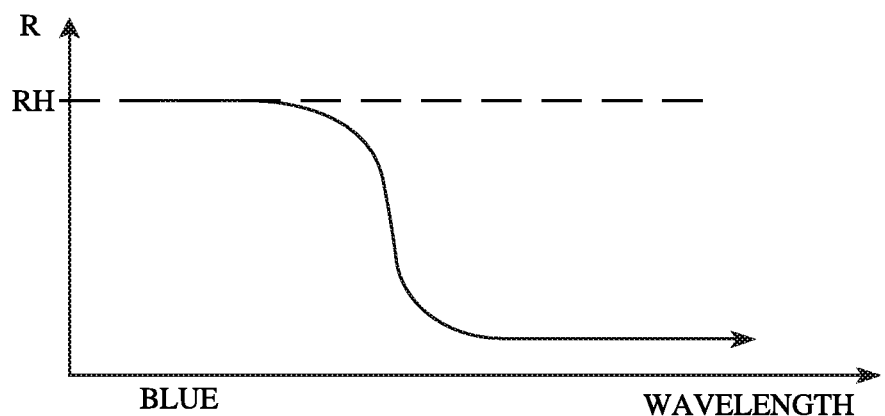
FIG. 10 is a graph of light reflection for an illustrative blue-light-reflecting thin-film interference filter in accordance with an embodiment.

In the graph of FIG. 10, the reflectivity R of an illustrative thin-film interference filter for optical layers 52 has been plotted as a function of wavelength. In the example of FIG. 10, the thin-film interference filter forms a blue-light-reflecting filter (sometimes referred to as a partially reflecting or partially transparent filter) exhibiting a reflectivity RH for blue light. The value of reflectivity RH may be, for example, between 50% and 90%, at least 60%, less than 80%, or other suitable value (e.g., the filter may be a partially transmitting blue-reflecting filter that is partially transparent to blue light). At red and green wavelengths, this filter may have more or less reflectivity than at blue wavelengths.

Figure 11:
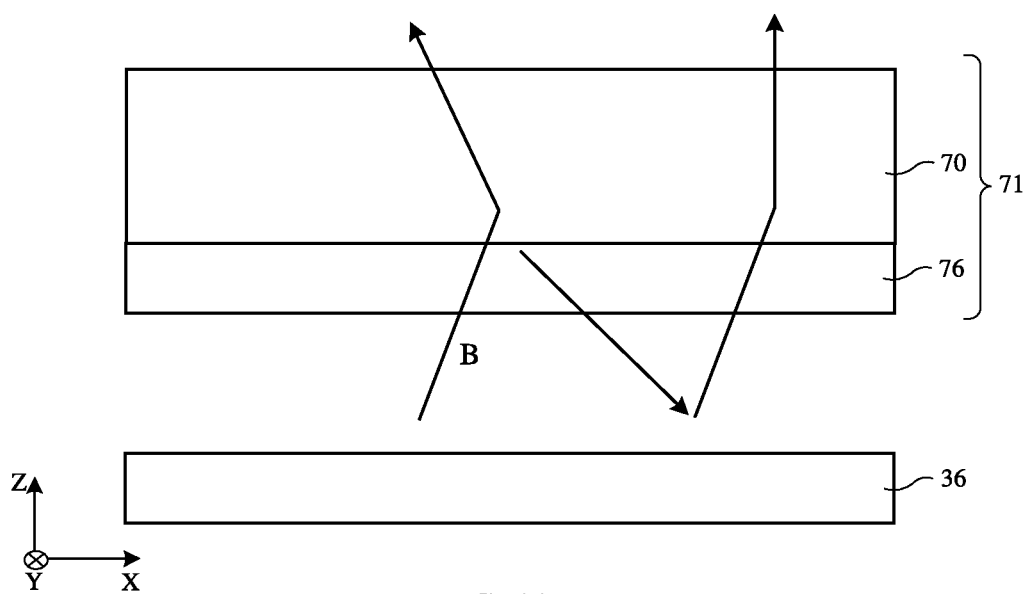
FIG. 11 is a diagram of an illustrative filter-and-diffuser layer and associated light-emitting source array in accordance with an embodiment.

FIG. 11 shows how a blue-reflecting thin-film interference filter of this type such as blue-light-reflecting filter 76 may be formed as a coating on diffuser 70 to form filter-and-diffuser layer 71. During operation, light-emitting diode array 36 may emit blue light B that is partially transmitted and partially reflected by blue-light reflecting filter 76. Transmitted light B passes upwards in the Z direction through diffuser 70 for use as backlight illumination 44. Reflected blue light B spreads laterally in dimensions X and Y before reflecting upwards off of structures in array 36 such as reflector 58 (FIGS. 6 and 7). This reduces hotspots.

Figure 12:
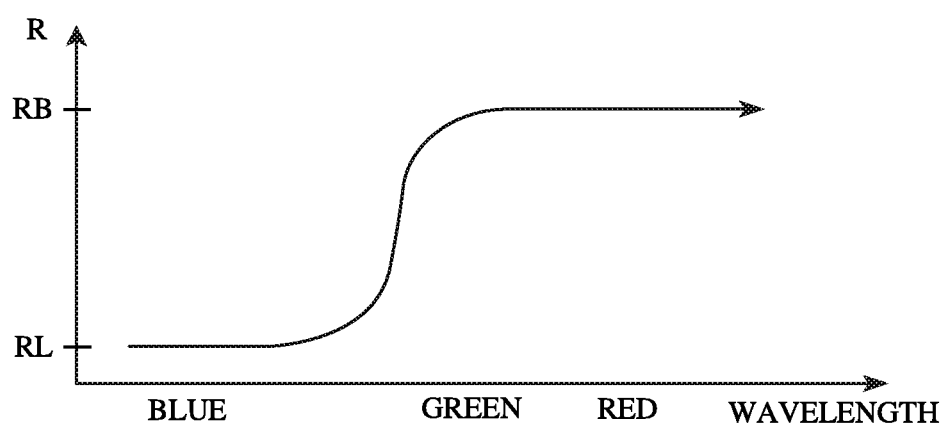
FIG. 12 is a graph of light reflection for an illustrative blue-light-transmitting-and-red-and-green-light-reflecting thin-film interference filter in accordance with an embodiment.
Figure 13:
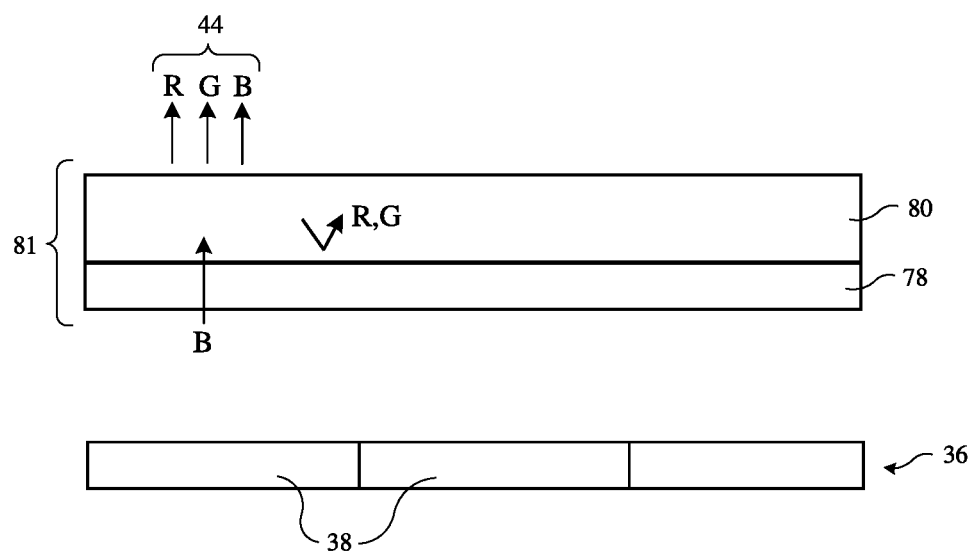
FIG. 13 is a cross-sectional side view of an illustrative filter-and-phosphor layer that may be used as a light conversion layer for light from an associated two-dimensional array of blue light-emitting diodes in accordance with an embodiment.
Figure 14:
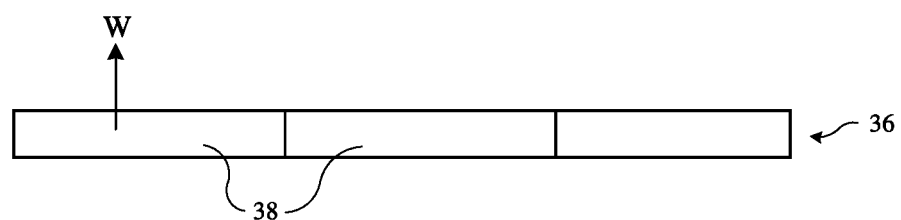
FIG. 14 is a cross-sectional side view of an illustrative two-dimensional array of white light-emitting diodes in accordance with an embodiment.

In the graph of FIG. 12, the reflectivity R of another illustrative thin-film interference filter for optical layers 52 has been plotted as a function of wavelength. In the example of FIG. 12, the thin-film interference filter forms a blue-transmitting-and-red-and-green-reflecting filter. This type of filter may be used to control red and green light that has been produced by illuminating a phosphor layer with blue light. As shown in FIG. 13, for example, light-emitting diode array 36 may produce blue light B. Blue-transmitting-and-red-and-green-reflecting filter 78 may transmit blue light to a photoluminescent layer such as yellow phosphor layer 80. In layer 80, some of blue light B is converted into red light R and green light G for use as white backlight illumination 44. Filter 78 may be formed as a coating on the lower surface of phosphor layer 80 to form filter-and-phosphor layer 81. The presence of filter 78 helps reflect red and green light produced in layer 80, thereby preventing red and green light from leaking laterally. If desired, light-emitting diode array 36 may contain white light-emitting diodes to emit white light W (FIG. 14).

Figure 15:
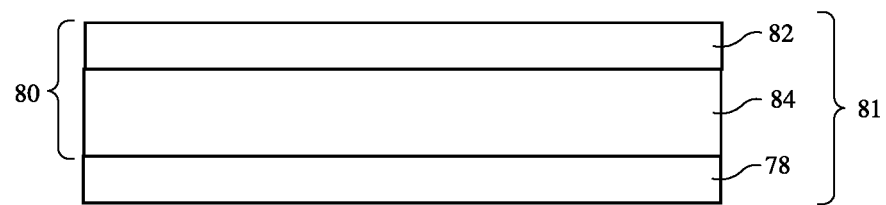
FIGS. 15 and 16 are cross-sectional side views of illustrative filter-and-phosphor layers in accordance with embodiments.
Figure 16:
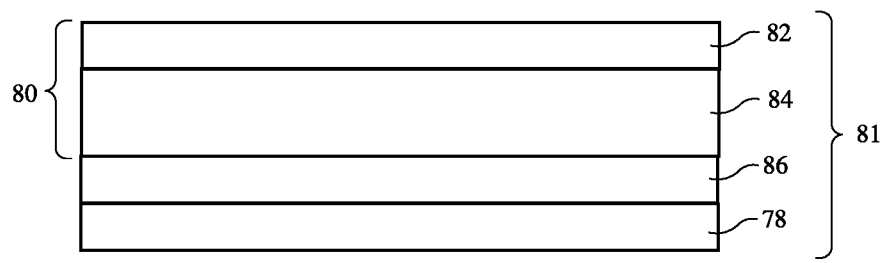

Filter 78 may be formed by depositing a dielectric stack (FIG. 9) on a polymer film and laminating this film to phosphor layer 80, as shown in FIG. 15. Phosphor layer 80 may include phosphor coating 84. Coating 84 may be deposited and cured on polymer substrate 82. In the illustrative configuration of FIG. 16, phosphor layer 80 includes a polymer barrier layer 86 on which filter 78 is deposited.

Figure 17:
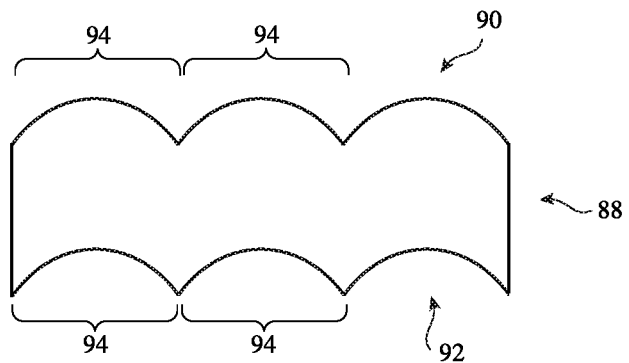
FIGS. 17, 18, and 19 are cross-sectional side views of illustrative microlens array layers in accordance with embodiments.
Figure 18:
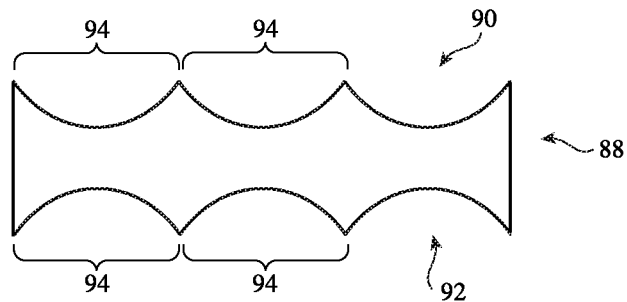
Figure 19:
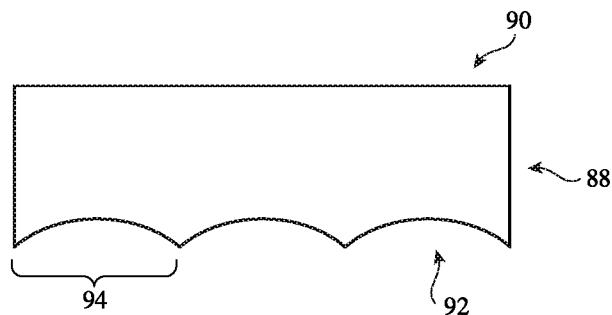

Microlens array layers such as illustrative layers 88 of FIGS. 17, 18, and 19 may be used to spread and homogenize light 44. Layers 88 may be relatively thin so as not to overly increase the thickness of display 14. For example, layers 88 may be 5-100 microns thick, at least 10 microns thick, or less than 150 microns thick. In the example of FIG. 17, upper (outwardly facing) surface 90 of layer 88 has an array of convex lenses such as convex microlenses 94 and lower (inwardly facing) surface 92 of layer 88 has an array of concave lenses such as concave microlenses 94. In the example of FIG. 18, upper surface 90 has concave microlenses 94 and lower surface 92 has concave microlenses 94. As shown in FIG. 19, layer 88 may, if desired, have a planar upper surface 90 (no microlenses) and a lower surface 92 with an array of concave microlenses 94. Configurations in which the illustrative layers 88 of FIGS. 17, 18, and/or 19 have lower surfaces with an array of convex microlenses 94 may also be used.

Microlenses 94 may have lateral dimensions of about 15-25 microns, at least 1 micron, at least 2 microns, at least 4 microns, at least 7 microns at least 10 microns, at least 20 microns, at least 40 microns, at least 100 microns, less than 300 microns, less than 150 microns, less than 75 microns, less than 30 microns, less than 15 microns, less than 5 microns, or other suitable lateral (X-Y plane) dimensions and may have heights of about 3-20 microns, at least 0.5 microns, at least 1 micron, at least 2 microns, at least 5 microns, at least 25 microns, at least 100 microns, less than 250 microns, less than 125 microns, less than 60 microns, less than 30 microns, or other suitable heights.

A non-uniform pattern may be used for microlenses 94 to reduce Moiré effects and to enhance light uniformity. For example, the heights, diameters, and/or center locations of lenses 94 may be randomized (e.g., lenses 94 may have a random distribution of powers produced by varying the lens curvature and clear aperture for lenses 94, while configuring the array of lenses 94 to exhibit a desired average power). If desired, microlenses 94 may be configured to form an array of lenses of a desired periodicity (e.g., a desired pitch) but each lens in the array (e.g., the lens at each row and/or column of the array) may have a lens center position that is offset by a random (non-uniform) amount relative to its nominal position within the array. The magnitude of the random lens center offset (in one or both lateral dimensions of the array) may be 1-30% of the nominal lens-center-to-lens-center spacing (pitch) of the array, may be at least 5% of the nominal spacing, may be at least 10% of the nominal spacing, may be less than 90% of the nominal spacing, may be less than 20% of the nominal spacing, etc. With this type of arrangement, the lens center of each lens in the array may be offset from the periodic pitch of the array by an amount that differs from that of its neighboring lenses in the array. The microlens array layer has an array of lenses arranged in rows and columns, each of the lenses has a lens center that is offset from a nominal lens center position in the array by an offset value, and the offset values of the lenses are different in different rows and columns (e.g., the offset value for each lens differs from that of the lenses in neighboring rows and/or columns). The use of intentionally offset lens center locations and/or lens powers and/or other non-uniform attributes lenses 94 may help reduce frequency contrast (e.g., periodic hot spots from light-emitting diodes).

Figure 20:
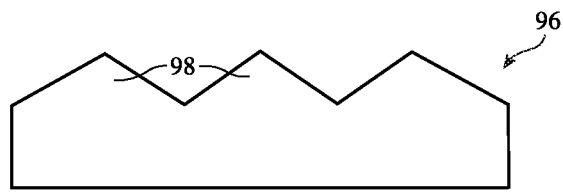
FIG. 20 is a cross-sectional side view of an illustrative light-collimating layer such as a prism film in accordance with an embodiment.

If desired, brightness enhancement films (sometimes referred to as prism films or light-collimating prism layers) may be used in collimating light 44. FIG. 20 is a cross-sectional side view of an illustrative prism film. As shown in FIG. 20, prism film 96 has a series of parallel ridges 98 that extend into the page and that have triangular cross-sectional shapes. Ridges 98 may face upwards (outwardly) towards the viewer to help collimate light 44 towards the viewer.

Figure 21:
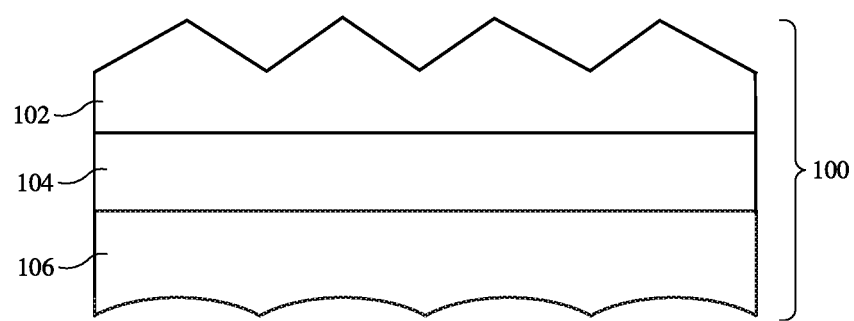
FIG. 21 is a cross-sectional side view of an illustrative prism-and-microlens array layer in accordance with an embodiment.

If desired, microlenses, light-collimating prisms, diffuser layers, phosphor layers, and/or other structures in layers 52 may be consolidated into multifunction films by sharing substrate films and/or other layers. Consider, as an example, the arrangement of FIG. 21. In the example of FIG. 21, a layer of light-collimating structures such as light-collimating prism film layer 102 has been formed on an upper surface of layer 104 and microlens array 106 has been formed on an opposing lower surface of layer 104. Layer 104 may be formed from a low-index-of-refraction polymer (e.g., a polymer film, a cured liquid polymer layer, etc.). Layers 102 and 106 may be formed by patterning and curing liquid polymer or other transparent material to form coatings on the upper and lower surfaces of layer 104 and/or may be formed from films that are laminated to each other (e.g., using layer 104).

Figure 22:
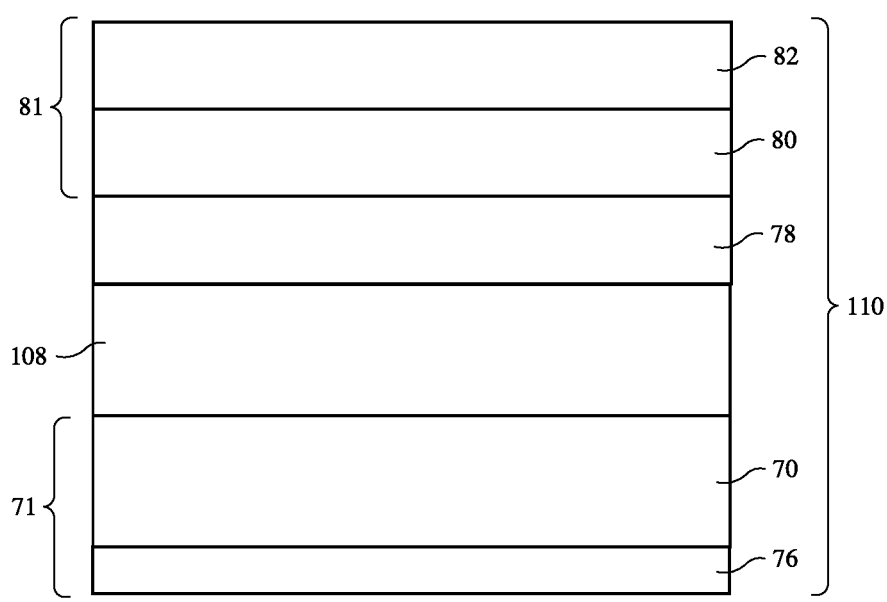
FIG. 22 is a cross-sectional side view of an illustrative light conversion layer in accordance with an embodiment.

Another illustrative multifunction optical film structure is shown in FIG. 22. In the example of FIG. 22, filter 78 has been formed on the lower surface of filter-and-phosphor layer 81. Filter-and-phosphor layer 81 includes substrate 82 and phosphor coating layer 80. Filter-and-diffuser layer 71 includes filter 76 on diffuser 70. A single optical film such as light conversion sheet 110 (sometimes referred to as a light conversion layer or conversion layer) may be formed by coupling filter 78 and layer 81 to layer 71 using polymer layer 108. Polymer layer 108 may be formed from a low-index-of-refraction polymer material that helps reduce reflections. Use of a multifunctional layer such as conversion sheet 110 and/or other multifunctional layers (e.g., layer 100 of FIG. 21) may help reduce assembly complexity when forming display 14.

Figure 23:
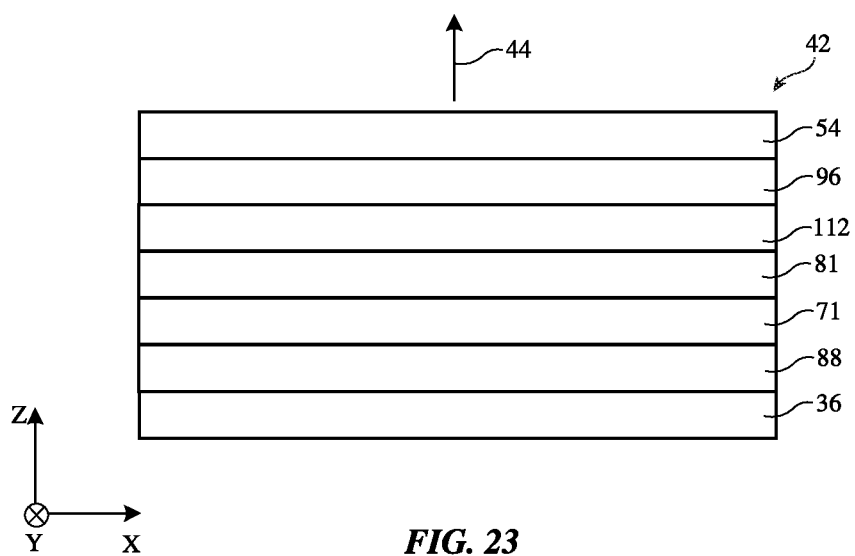
FIGS. 23 and 24 are cross-sectional side views of illustrative backlights in accordance with embodiments.
Figure 24:
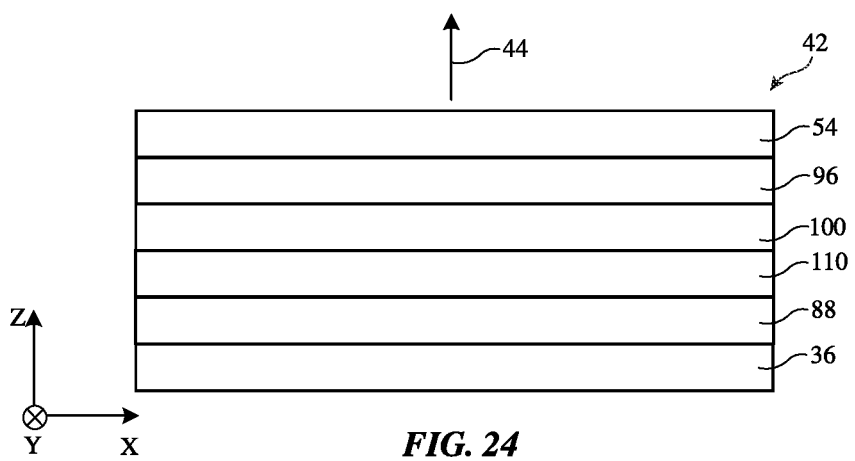

Illustrative backlight structures for display 14 are shown in FIGS. 23 and 24.

As shown in the illustrative configuration of FIG. 23, backlight unit 42 may include a light source such as light-emitting diode array 36. Light from array 36 passes upwards in the +Z direction through the layers stacked on top of array 36 and exits backlight unit 42 as backlight illumination 44. Microlens array layer 88 may be located above array 36. Layer 88 may be an array layer of the type shown in FIG. 17 or, if desired, an array layer of other types such as arrays 88 of FIGS. 18 and 19). Filter-and-diffuser layer 71 may be located above layer 88. Filter-and-phosphor layer 81 may be located above layer 71.

Layer 112 may be a multifunctional layer such as layer 100 of FIG. 21 (e.g., a layer that includes a first side with a microlens array and a second side with light-collimating prisms). In another illustrative configuration, layer 112 is formed from a lower layer (e.g., a microlens array such as lens array layer 88 of FIG. 18 or, if desired, a microlens array layer such as layer 88 of FIG. 17, layer 88 of FIG. 19, etc.) and from an upper layer that lies above the lower layer (e.g., an upper layer such as a light-collimating prism film).

Light-collimating prism layer 96 may be located above layer 112. The prisms of layer 96 may run perpendicular to the prisms of layer 112. For example, if the prisms of layer 112 are parallel to the X axis, the prisms of layer 96 may be parallel to the Y axis. Reflective polarizer 54 may be located above layer 96.

If desired, a multifunctional light-conversion layer such as conversion sheet 110 of FIG. 22 and a multifunctional layer such as prism-and-microlens layer 100 of FIG. 21 may be incorporated into backlight unit 42. This type of arrangement is shown in FIG. 24. As shown in FIG. 24, microlens array layer 88 may be located above array 36. Layer 88 may be an array layer of the type shown in FIG. 17 or, if desired, an array layer of other types such as arrays 88 of FIGS. 18 and 19 or other microlens array layers). Conversion sheet 110 may be located above layer 88. Prism-and-microlens layer 100 may be located above layer 110. Light-collimating prism layer 96 may be located above layer 100. The prisms of layer 96 may run perpendicular to the prisms of layer 100. For example, if the prisms of layer 100 run parallel to the X axis, the prisms of layer 96 may run parallel to the Y axis. Reflective polarizer 54 may be located above layer 96.

In accordance with an embodiment, a display is provided that includes pixels configured to display images, a backlight configured to produce backlight illumination for the pixels, the backlight includes a two-dimensional array of light sources that are configured to emit light, a light conversion layer interposed between the two-dimensional array of light sources and the pixels, the light conversion layer includes a polymer substrate layer, a phosphor layer on the substrate layer, a first filter layer on the phosphor layer, a diffuser layer, polymer material that attaches the diffuser layer to the first filter layer and a second filter layer on the diffuser layer.

In accordance with another embodiment, the first filter layer includes a blue-transmitting-and-red-and-green-reflecting thin-film interference filter.

In accordance with another embodiment, the second filter layer includes a blue-reflecting thin-film interference filter configured to partially reflect blue light.

In accordance with another embodiment, the two-dimensional array of light sources includes an array of blue light-emitting diodes.

In accordance with another embodiment, the display includes a printed circuit to which the blue light-emitting diodes are mounted and a reflector on the printed circuit with openings that receive the blue light-emitting diodes.

In accordance with another embodiment, the reflector includes an ultraviolet-light-cured white ink layer on the printed circuit and a thermally cured white ink layer on the ultraviolet-light-cured white ink layer.

In accordance with another embodiment, the first and second filter layers are thin-film interference filters formed from stacks of dielectric layers.

In accordance with another embodiment, the display includes a microlens array layer interposed between the light conversion layer and the two-dimensional array of light sources.

In accordance with another embodiment, the display includes the microlens array layer has opposing first and second surfaces, the first surface has concave lenses facing the two-dimensional array of light sources, and the second surface has convex lenses facing the light conversion layer.

In accordance with another embodiment, the display includes the microlens array layer includes a plurality of lenses with non-uniform lens powers.

In accordance with another embodiment, the display includes the microlens array layer includes a plurality of lenses with non-uniform sizes.

In accordance with another embodiment, the display includes the microlens array layer includes lenses having randomized lens center locations.

In accordance with another embodiment, the microlens array layer has an array of lenses arranged in rows and columns, each of the lenses has a lens center that is offset from a nominal lens center position in the array by an offset value, and the offset value for each lens differs from that of the lenses in neighboring rows and columns.

In accordance with another embodiment, the display includes a prism-and-microlens layer interposed between the pixels and the light conversion layer, the prism-and-microlens layer includes a polymer layer, a layer of microlenses on a first surface of the polymer layer, and an array of light-collimating prisms on an opposing second surface of the polymer layer.

In accordance with another embodiment, the display includes a reflective polarizer interposed between the prism-and-microlens layer and the pixels.

In accordance with another embodiment, the display includes a layer of light-collimating structures between the reflective polarizer and the prism-and-microlens layer.

In accordance with an embodiment, a display is provided that includes a two-dimensional array of light sources, pixels and optical films between the array of light sources and the pixels, the optical films include a prism-and-microlens layer having light-collimating structures facing the pixels and an array of microlenses facing the two-dimensional array of light sources.

In accordance with another embodiment, the display includes a microlens array layer interposed between the prism-and-microlens layer and the two-dimensional array of light sources.

In accordance with another embodiment, the display includes the microlens array layer has concave microlenses facing the two-dimensional array of light sources.

In accordance with another embodiment, the display includes the two-dimensional array of light sources includes a two-dimensional array of blue light sources configured to produce blue light and the display further includes a light conversion layer between the prism-and-microlens layer and the microlens array layer that is configured to convert at least part of the blue light to red and green light.

In accordance with another embodiment, the light conversion layer includes a polymer substrate layer, a phosphor layer on the substrate layer, and a blue-transmitting-and-red-and-green reflecting thin-film interference filter on the phosphor layer.

In accordance with another embodiment, the light conversion layer includes a diffuser layer, polymer material coupled between the diffuser layer and the first filter layer, and a blue-reflecting thin-film interference filter on the diffuser layer that is configured to partially reflect blue light.

In accordance with an embodiment, a display is provided that includes a two-dimensional array of light sources that produce light, pixels illuminated by the light, a first microlens array layer, the first microlens array layer is between the pixels and the two-dimensional array of light sources, a diffuser between the microlens array layer and the pixels, a filter-and-phosphor layer having phosphor and a thin-film interference filter, the filter-and-phosphor layer is between the diffuser and the pixels, a second microlens array layer, the second microlens array layer is between the filter-and-phosphor layer and the pixels.

In accordance with another embodiment, the display includes a first light-collimating prism film between the second microlens array layer and the pixels, and a second light-collimating prism film between the first light-collimating prism film and the pixels, and a reflective polarizer between the pixels and the second light-collimating prism film.

The foregoing is merely illustrative and various modifications can be made to the described embodiments. The foregoing embodiments may be implemented individually or in any combination.

What is claimed is:

1. A display, comprising:
    pixels configured to display images;
    a backlight configured to produce backlight illumination for the pixels, wherein the backlight comprises:
        a two-dimensional array of light sources that are configured to emit light; and
        a light conversion layer interposed between the two-dimensional array of light sources and the pixels, wherein the light conversion layer comprises:
            a polymer substrate layer;
            a phosphor layer on the substrate layer;
            a first filter layer on the phosphor layer;
            a diffuser layer;
            polymer material that attaches the diffuser layer to the first filter layer; and
            a second filter layer on the diffuser layer.

2. The display defined in claim 1 wherein the first filter layer comprises a blue-transmitting-and-red-and-green-reflecting thin-film interference filter.

3. The display defined in claim 1 wherein the second filter layer comprises a blue-reflecting thin-film interference filter configured to partially reflect blue light.

4. The display defined in claim 1 wherein the two-dimensional array of light sources comprises an array of blue light-emitting diodes.

5. The display defined in claim 4 further comprising:
    a printed circuit to which the blue light-emitting diodes are mounted; and
    a reflector on the printed circuit with openings that receive the blue light-emitting diodes.

6. The display defined in claim 5 wherein the reflector comprises:
    an ultraviolet-light-cured white ink layer on the printed circuit; and
    a thermally cured white ink layer on the ultraviolet-light-cured white ink layer.

7. The display defined in claim 1 wherein the first and second filter layers are thin-film interference filters formed from stacks of dielectric layers.

8. The display defined in claim 1 further comprising a microlens array layer interposed between the light conversion layer and the two-dimensional array of light sources.

9. The display defined in claim 8 wherein the microlens array layer has opposing first and second surfaces, wherein the first surface has concave lenses facing the two-dimensional array of light sources, and wherein the second surface has convex lenses facing the light conversion layer.

10. The display defined in claim 8 wherein the microlens array layer includes a plurality of lenses with non-uniform lens powers.

11. The display defined in claim 8 wherein the microlens array layer includes a plurality of lenses with non-uniform sizes.

12. The display defined in claim 8 wherein the microlens array layer includes lenses having randomized lens center locations.

13. The display defined in claim 8 wherein the microlens array layer has an array of lenses arranged in rows and columns, wherein each of the lenses has a lens center that is offset from a nominal lens center position in the array by an offset value, and wherein the offset value for each lens differs from that of the lenses in neighboring rows and columns.

14. The display defined in claim 1 further comprising a prism-and-microlens layer interposed between the pixels and the light conversion layer, wherein the prism-and-microlens layer includes a polymer layer, a layer of microlenses on a first surface of the polymer layer, and an array of light-collimating prisms on an opposing second surface of the polymer layer.

15. The display defined in claim 14 further comprising a reflective polarizer interposed between the prism-and-microlens layer and the pixels.

16. The display defined in claim 15 further comprising a layer of light-collimating structures between the reflective polarizer and the prism-and-microlens layer.

17. A display, comprising:
- a two-dimensional array of light sources;
- pixels;
- optical films between the array of light sources and the pixels, wherein the optical films include a prism-and-microlens layer having a first surface facing the pixels and a second surface facing the two-dimensional array of light sources, wherein the prism-and-microlens layer has light-collimating structures on the first surface and an array of microlenses on the second surface; and
- an additional microlens array layer interposed between the prism-and-microlens layer and the two-dimensional array of light sources.

18. The display defined in claim 17 wherein the additional microlens array layer has concave microlenses facing the two-dimensional array of light sources.

19. The display defined in claim 18 wherein the two-dimensional array of light sources comprises a two-dimensional array of blue light sources configured to produce blue light and wherein the display further comprises a light conversion layer between the prism-and-microlens layer and the additional microlens array layer that is configured to convert at least part of the blue light to red and green light.

20. The display defined in claim 19 wherein the light conversion layer comprises:
- a polymer substrate layer;
- a phosphor layer on the substrate layer; and
- a blue-transmitting-and-red-and-green reflecting thin-film interference filter on the phosphor layer.

21. The display defined in claim 20 wherein the light conversion layer further comprises:
- a diffuser layer;
- polymer material coupled between the diffuser layer and the first filter layer; and
- a blue-reflecting thin-film interference filter on the diffuser layer that is configured to partially reflect blue light.

22. A display, comprising:
- a two-dimensional array of light sources that produce light;
- pixels illuminated by the light;
- a first microlens array layer, wherein the first microlens array layer is between the pixels and the two-dimensional array of light sources;
- a diffuser between the microlens array layer and the pixels;
- a filter-and-phosphor layer having phosphor and a thin-film interference filter, wherein the filter-and-phosphor layer is between the diffuser and the pixels; and
- a second microlens array layer, wherein the second microlens array layer is between the filter-and-phosphor layer and the pixels.

23. The display defined in claim 22 further comprising:
- a first light-collimating prism film between the second microlens array layer and the pixels; and
- a second light-collimating prism film between the first light-collimating prism film and the pixels; and
- a reflective polarizer between the pixels and the second light-collimating prism film.

* * * * *